United States Patent [19]
Tokita et al.

[11] Patent Number: 5,240,534
[45] Date of Patent: Aug. 31, 1993

[54] APPARATUS AND METHOD FOR JOINING ELASTOMERIC SHEET MATERIAL

[75] Inventors: Noboru Tokita, Woodbridge, Conn.; John R. Lindquist, Akron, Ohio

[73] Assignee: Uniroyal Goodrich Tire Company, Akron, Ohio

[21] Appl. No.: 651,174

[22] Filed: Feb. 6, 1991

[51] Int. Cl.⁵ .................. B65H 69/06; B65H 69/00
[52] U.S. Cl. .................... 156/157; 156/134; 156/502
[58] Field of Search ............ 156/134, 544, 502, 304.1, 156/304.3, 157, 158, 406.4, 406.6, 421.4, 466, 421, 229, 266; 474/253; 24/38; 69/7

[56] References Cited
U.S. PATENT DOCUMENTS

| | | | |
|---|---|---|---|
| 160,770 | 3/1875 | Hatch | 69/7 |
| 3,303,255 | 2/1967 | Bracey, Jr. | 264/248 |
| 3,519,507 | 7/1970 | Pierson | 156/157 X |
| 4,135,957 | 1/1979 | Voller | 156/157 |
| 4,261,393 | 4/1981 | Inoue | |
| 4,466,473 | 8/1984 | Sebak | |
| 5,021,115 | 6/1991 | Tokita | 156/406.6 |

Primary Examiner—Geoffrey L. Knable
Attorney, Agent, or Firm—Alan A. Csontos

[57] ABSTRACT

Joining elastomeric sheets includes providing a support surface with a cavity therein. End portions of the elastomeric sheets are overlapped so each end portion spans the cavity. A tool is located on a side of the elastomeric sheets opposite the cavity. A portion of the tool is moved into the cavity to deform the end portions of the elastomeric sheets and to form a joint having less than the combined thickness of the end portions of the elastomeric sheets prior to deformation.

10 Claims, 2 Drawing Sheets

APPARATUS AND METHOD FOR JOINING ELASTOMERIC SHEET MATERIAL

BACKGROUND OF THE INVENTION

1. TECHNICAL FIELD

The present invention relates generally to joining end portions of elastomeric sheet material. Particularly, the present invention relates to joining end portions of elastomeric sheet material having substantially parallel extending reinforcing members.

2. DESCRIPTION OF THE PRIOR ART

A typical pneumatic radial tire includes a carcass ply which is made from at least one strip of elastomeric sheet material. The elastomeric sheet material has a plurality of parallel extending reinforcing members. Each reinforcing member of the carcass ply is contained in a plane extending substantially radially of the axis of rotation of the tire. End portions of the strip of elastomeric sheet material are overlapped to form a joint The joint has a length taken in a direction perpendicular to the extent of reinforcing members. The length of the joint is typically in the range of approximately one-quarter of an inch to one inch. The joint also has a thickness taken in direction normal to the length. The thickness of the joint is substantially double the thickness of the elastomeric sheet material. The joint may cause uniformity variations in an area of the tire where the double thickness joint extends under the bead cores.

The joint also has a density of reinforcing members which is approximately double the density of reinforcing members in any other area of the carcass ply. This results in an area of the carcass which is approximately twice the strength of any other area of the carcass. Strength is defined as resistance to expansion of the carcass in the radial direction due to inflation pressure in the tire. The double strength of the joint may result in a visible sidewall indentation in the tire when the tire is inflated. Furthermore, when the tire is tested for uniformity, a variation from the applied test load is often attributable to the double strength of the joint area of the carcass.

U.S. Pat. No. 4,466,473 discloses one end portion of a strip of fiber reinforced elastomeric sheet material which is cut at several locations. The cut extends across the reinforcing fibers for a distance approximately equal to the length of the joint. The cut end portion of the strip contributes substantially no strength to the joint. Thus, the joint has a strength which is substantially equal to the strength of any other area of the tire carcass.

U.S. Pat. No. 4,261,393 discloses a carcass ply for a radial tire including two or three strips of reinforced elastomeric sheet material joined together at end portions. The end portions of the strips of elastomeric sheet material are specially made for the purpose of forming a joint. In one embodiment of U.S. Pat. No. 4,261,393, end portions of each strip used to form a joint contain reinforcing fibers of a smaller diameter than the fibers in an intermediate portion of the strip. The smaller diameter reinforcing fibers have a proportionately lower tensile strength than the reinforcing fibers in the intermediate portion. When the end portions form a joint, the joint has a greater density of fibers than the intermediate portion but the joint has substantially the same strength as the intermediate portion.

In another embodiment of U.S. Pat. No. 4,261,393, the end portions of each strip of elastomeric sheet material contain reinforcing fibers of a diameter equal to the reinforcing fibers in the intermediate portion of the strip. However, adjacent reinforcing fibers in the end portions are spaced apart a greater distance than adjacent reinforcing fibers in the intermediate portion. When the end portions form a joint, reinforcing fibers from one of the end portions are located between reinforcing fibers of the other end portion. The resulting spacing between adjacent reinforcing fibers in the joint is approximately the same as the spacing between adjacent reinforcing fibers in the intermediate portion. Thus, the strength in the joint is substantially equal to the strength in the intermediate portion.

SUMMARY OF THE INVENTION

The present invention is directed to an apparatus and to a method for joining end portions of elastomeric sheet material for use in a vehicle tire. If the elastomeric sheet material is reinforced, as used for a carcass, the resulting joint does not have the double strength disadvantages discussed above. If the elastomeric sheet material is not reinforced, as used for an innerliner, the resulting joint has less than twice the thickness of the elastomeric sheet material.

The apparatus for joining end portions of reinforced elastomeric sheet material includes means for supporting the end portions of the sheet material in an overlapping relationship. Surface means defines a cavity in the supporting means. Tool means has a portion moveable from a first position located outside of the cavity to a second position located within the cavity. Moving means moves the portion of the tool means from the first position to the second position to deform the end portions of the elastomeric sheet material and increase the spacing between adjacent reinforcing members in the end portions and to introduce a reinforcing member from one end portion at least partially between adjacent reinforcing members in the other end portion.

The apparatus for joining end portions of unreinforced elastomeric sheet material having a substantially uniform thickness comprises surface means including a cavity therein. Means for placing a pair of end portions of the elastomeric sheet material onto the surface means in an overlapping relationship over the cavity is provided. Tool means is moveable from a first position spaced from the cavity on one side of the elastomeric sheet material when the elastomeric sheet material is supported by the surface means to a second position within the cavity. Means for moving said tool means from the first position to the second position is provided in order to deform the elastomeric sheet material by increasing the length and decreasing the thickness of each of the pair of end portions of the elastomeric sheet material located within the cavity and to form a joint having a combined thickness less than twice the thickness of the elastomeric sheet material prior to deformation.

The supporting and surface means preferably comprises a substantially planar surface. The tool means comprises a disk member rotatable about its longitudinal central axis. The tool means is also moveable in a direction parallel to the extent of the cavity in the supporting and surface means. Preferably the spacing between adjacent reinforcing members is increased to three times the spacing of adjacent member before the end portions are deformed. The density of the spaced apart member is preferably at least one half the density of the reinforcing member before deformation of the end portions. The thickness of the elastomeric sheet material is decreased to approximately 0.67 of the thickness of the sheet material prior to deformation.

The method of joining reinforced elastomeric sheet material includes providing first and second reinforced elastomeric sheets. Each of the elastomeric sheets has a plurality of elongate reinforcing members extending in a substantially parallel direction and being spaced apart a substantially equal distance. An end portion of the first elastomeric sheet is arranged in an overlapping relationship with an end portion of the second elastomeric sheet over a cavity in a support surface. A tool is moved in a direction transverse to the overlapped end portions of the elastomeric sheets so a portion of the tool is located in the cavity to deform the end portions and to introduce at least one reinforcing member in the end portion of the first elastomeric sheet between adjacent reinforcing members in the en portion of the second elastomeric sheet.

The method of joining unreinforced elastomeric sheets includes the steps of providing a surface with a cavity therein. End portions of the elastomeric sheets are overlapped so each end portion spans the cavity. A tool is provided on a side of the elastomeric sheets opposite the cavity. The tool is moved into the cavity to deform the end portions of the elastomeric sheets and to form a joint having a thickness less than the combined thickness of the end portions of the elastomeric sheets prior to deformation.

BRIEF DESCRIPTION OF THE DRAWINGS

Further features of the present invention will become apparent to those skilled in the art to which the present invention relates from reading the following specification with reference to the accompanying drawings, in which.

DESCRIPTION OF A PREFERRED EMBODIMENT

Figure 1:
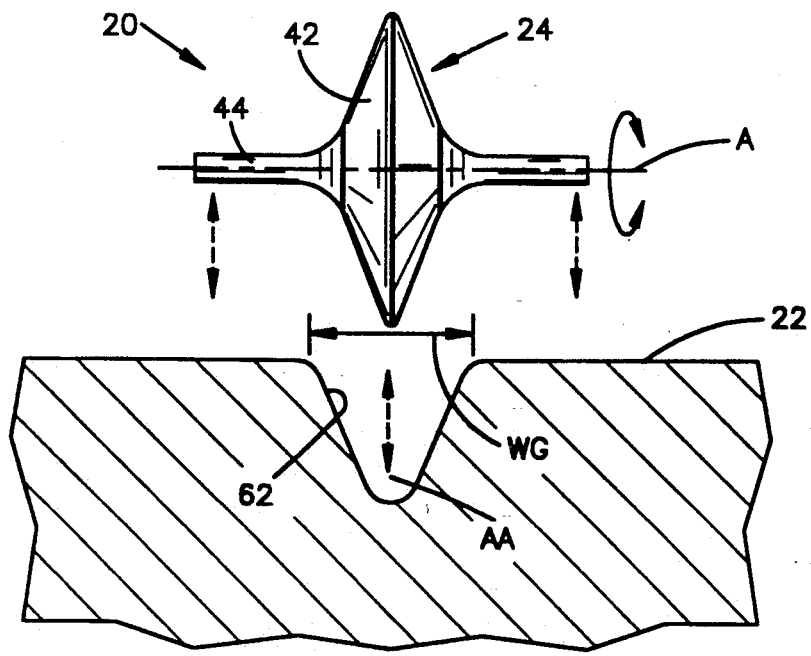
FIG. 1 is a cross sectional view of a joint former of the present invention.

A joint former 20 is illustrated in FIG. 1. The joint former 20 is for forming a joint between two elastomeric sheets used in making a tire. The joint former 20 includes a support surface 22 and a tool 24.

The support surface 22 may be any suitable surface, for example as may exist on a servicer table or tire building drum. Preferably, the surface 22 is planar and of sufficient size to accommodate the largest elastomeric sheets contemplated to be used in making the tire. The tool 24 may be any suitable tool, such as a tool member disclosed in U.S application Ser. No. 07/376,480 filed Jul. 7, 1989 or such as a stitcher roller. The tool 24 preferably includes a disk shaped member 42. The tool 24 also includes a shaft 44 which supports the disk member 42 for rotation about a longitudinal central axis A. The tool 24 is moveable, as illustrated in FIG. 1 in a direction transverse to the support surface 22.

The surface 22 includes a cavity 62. The cavity 62 extends for a distance along its axis AA which is greater than the greatest width of elastomeric sheet material contemplated to be used. Typically, elastomeric sheets used in making a passenger car or light truck radial tire are cut to a width of twelve to thirty-four inches. Thus, the length of the cavity 62 is preferably at least thirty-four inches.

Figure 3:
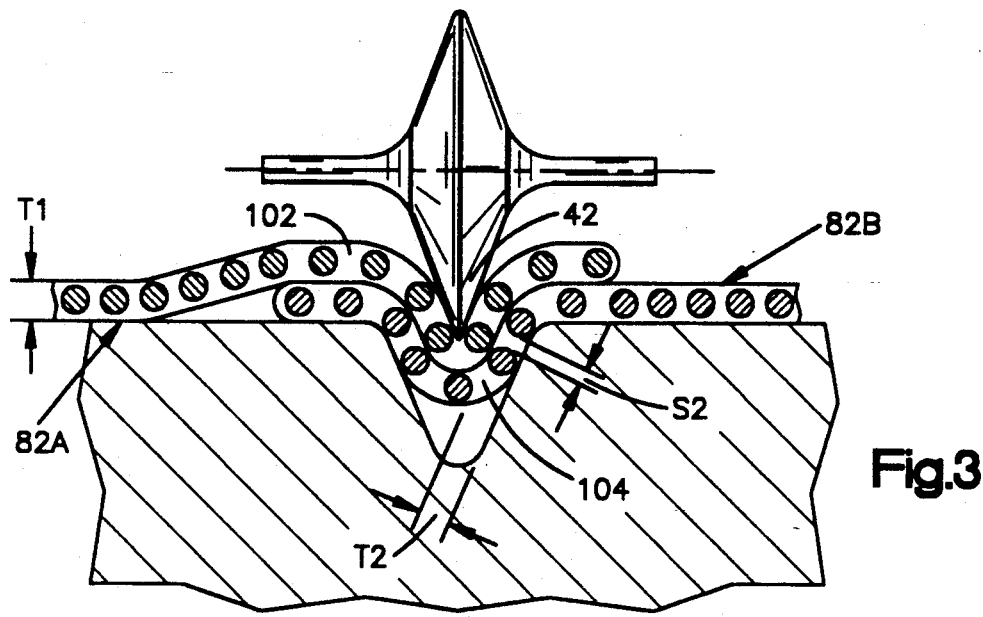
FIG. 3 is a cross sectional view of a portion of a tool of the joint former moved an initial distance into the cavity in the support surface to start deforming the overlapped end portions.
Figure 4:
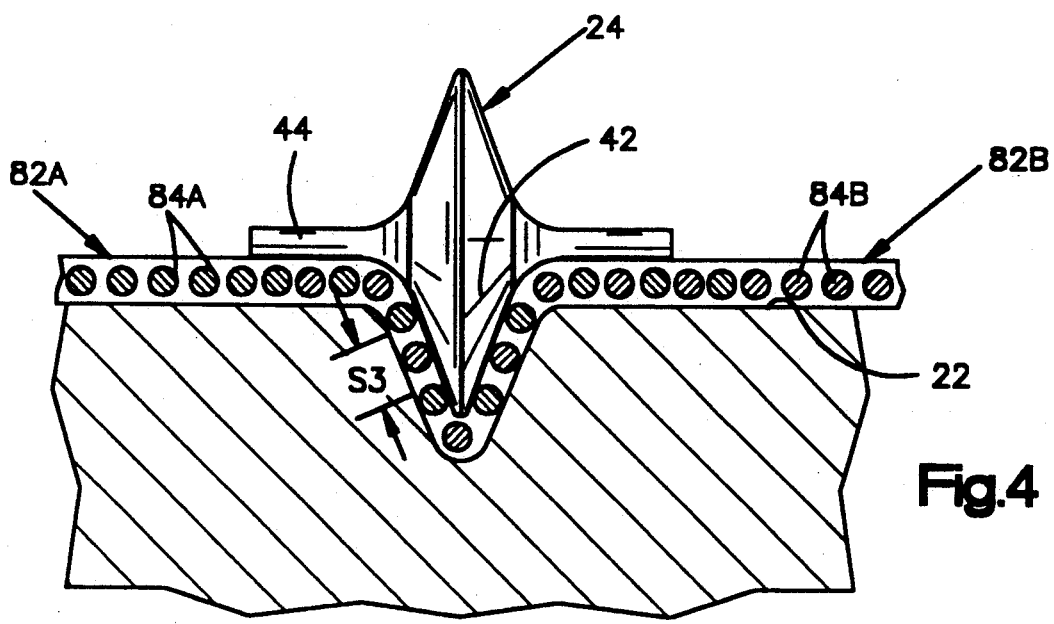
FIG. 4 is a cross sectional view of the portion of the tool moved further into the cavity in the support surface.

The cavity 62 has a substantially U-shaped or V shaped configuration. It will be apparent that the exact configuration of the cavity 62 may vary. The cavity 62 has a width WG taken in a plane extending substantially perpendicular to the axis AA of the cavity. A portion of the disk member 42 is moveable into the cavity 62. Preferably, the configuration of the disk member 42 is similar to the configuration of the cavity 62, as illustrated in FIGS. 1, 3 and 4.

Elastomeric sheets 82A,82B (FIG. 2) are provided for use in making the tire. It should be apparent that if elastomeric sheets 82A,82B are used that do not have reinforcing members, such elastomeric sheets are typically suitable for use as an innerliner of a tire. If reinforcing members 84A,84B are present in the elastomeric sheets 82A,82B the elastomeric sheets are suitable for use as a tire carcass or belt ply.

In a preferred embodiment of the invention, each of the elastomeric sheets 82A,82B includes a plurality of reinforcing members 84A,84B, respectively. The reinforcing members 84A,84B extend in a direction substantially parallel to one another and are placed in tension when a tire including the elastomeric sheets 82A,82B is inflated. The reinforcing members 84A,84B may be of any suitable material such as nylon, polyester, steel or the like.

The reinforcing members 84A,84B are held together in a rubber matrix material 86 The rubber matrix material 86 may include any suitable natural rubber, synthetic rubber or any combination of the two rubbers. The reinforcing members 84 are disposed within the rubber material 86 in such a manner that they have a first predetermined density. The first predetermined density is defined a the number of reinforcing members 84A or 84B per unit length L1, and is often referred to in terms of ends per inch (EPI). Typically, a tire carcass includes reinforcing members with a density in the range of ten to forty EPI, and preferably twenty to thirty EPI for a passenger car tire.

The diameter of the reinforcing members 84A,84B is typically in the range of 0.010 to 0.070 inch, and preferably is 0.019 to 0.027 inch for a passenger car tire. Each of the elastomeric sheets 82A,82B has a substantially uniform thickness T1 taken in a direction substantially normal to the extent of the sheet. The reinforcing members 84A,84B are spaced apart a substantially equal distance S1. Preferably, the distance S1 is at least approximately equal to one-half of the diameter of the reinforcing members 84A,84B.

Figure 2:
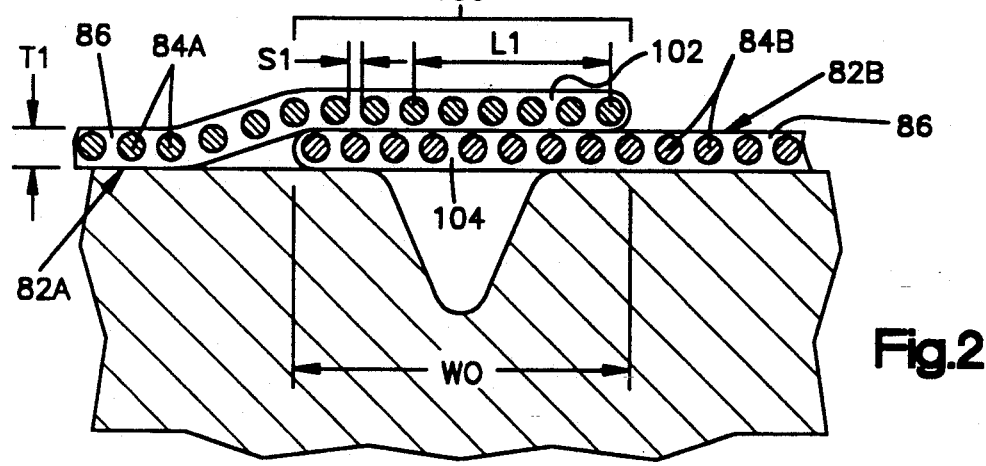
FIG. 2 is a cross sectional view of end portions of reinforced elastomeric sheet material overlapped over a cavity in the support surface of the joint former.

The elastomeric sheets 82A,82B are arranged on the working surface 22 so respective end portions 102 104 of the sheets overlap in a region located over the cavity 62, as illustrated in FIG. 2. The overlapped portion 106 of the elastomeric sheets 82A,82B has a width WO which is greater than the width WG of the cavity 62. The elastomeric sheets 82 may be placed on the support surface 22 in the overlapping relationship either manually or mechanically.

The tool 24 is spaced away from the support surface 22 on a first side of the overlapped portion 106 of the elastomeric sheets 82A,82B. To start the joining operation, the tool 24 is moved into engagement with the overlapped portion 106 of the elastomeric sheets 82A,82B. The tool 24 is then advanced further so a portion of the disk member 42 extends into the cavity 62, as illustrated in FIG. 3, to start deforming the end portions 102,104. The tool 24 can be moved manually or mechanically by a suitable mechanism. The tool 24 is then moved from the position illustrated in FIG. 3 to the position illustrated in FIG. 4 to further deform the end portions 102,104.

During movement of the tool 24 into the cavity 62, several events take place within the deformed end portions 102,104 of the elastomeric sheets 82A,82B. For example, the density of the fibers 84A,84B in each of the end portions 102,104 of the elastomeric sheets 82A,82B decreases. The spacing between reinforcing members 84A,84B increases from distance S1 (FIG. 2) to distance S2 and S3 (FIG. 3 and FIG. 4, respectively). The distance S3 is at least twice distance S1 and is preferably three times S1. The density of reinforcing members 84A,84B decreases because the length of the end portions 102,104 located in and immediately adjacent the cavity 62 increases. The density of the reinforcing members 84A,84B in each elastomeric sheet 82A,82B decreases to less than 0.75 times the pre deformation density and is preferably 0.67 times the pre-deformation density.

Concurrently, the thickness of each of the end portions 102,104 of the elastomeric sheets 82A,82B, located in and immediately adjacent the cavity 62, decreases to a thickness T2 (FIG. 3) which is less than thickness T1. The thickness T2 is less than 0.75 times the prior to deformation thickness T1 and preferably is less than 0.67 times thickness T1. Thus, the thickness T3 (FIG. 5) of the resulting joint 108 is less than 1.5 times the thickness T1 of the individual elastomeric sheets 82A,82B, and preferably is less than 1.34 times the thickness T1.

Figure 5:
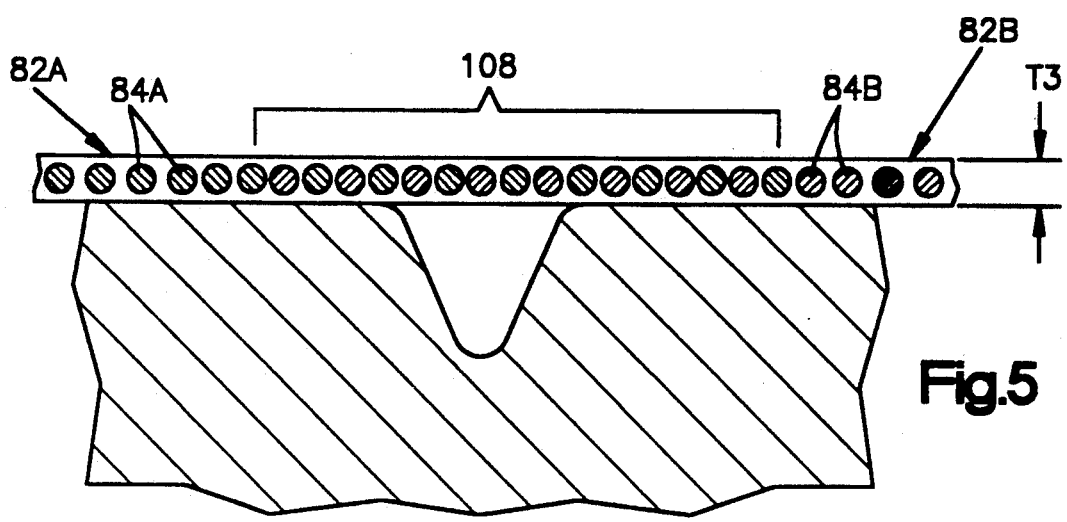
FIG. 5 is a cross sectional view of the joint made according to the present invention.

Also a reinforcing member 84A from the end portion 102 of elastomeric sheet 82A is moved between adjacent reinforcing members 84B from the end portion 104 (note the direction of hatching used to differentiate the reinforcing members 84A and 84B) of the elastomeric sheet 82A,82B. Thus, the density of the reinforcing members 84 in the joint is not doubled. During this joining operation the tackiness of the contacting surfaces of the elastomeric sheets 82A,82B hold the end portions 102,104 together to form the joint 108 (FIG. 5). It will be apparent that the size of the cavity 62 and/or the tool 42 will determine the ultimate spacing and density of the reinforcing members 84A,84B, as well as the ultimate thickness T3 of the joint 108.

Thus, the joint 108 is formed between the two elastomeric sheets 82A,82B which has a thickness T3 legs than the additive thicknesses T1 of the two separate elastomeric sheets 82A,82B. Furthermore, reinforcing members 84A from one end portion 102 of the sheet 82A are introduced between adjacent reinforcing members 84B of the end portion 104 of sheet 82B. The density of the reinforcing members 84A,84B in the joint 108 is less than double the density of a reinforcing members in each sheet 82A or 82B, and preferably no greater than 1.5 times. The density is no greater than 1.5 times the density of each sheet 82A or 82B, and preferably no greater than 1.33 times. The joint 108 having such physical characteristics does not suffer from the disadvantages described above.

The tool 24 is further moved in a direction parallel to the axis AA Of the cavity 62 and of the reinforcing members 84A,84B for the length of the cavity 62 while the portion of the disk member 42 is still within the cavity. The tool 24 may be moved manually or mechanically along the cavity 62. This assures a consistent joint 108 between the end portions 102,104 of the sheet members 82A,82B for its entire length. During this movement of the tool 24, pressure can be applied and rotation of the disk member 42 occurs about its axis A. The shaft 44 may also contact the end portion 102 located outside of the cavity 62 to force members 84A between members 84B of end portion 104.

Once the tool 24 is removed and again located in the position, illustrated in FIG. 1, spaced apart from the support surface 22 and joint 108, the joining operation is completed. The elastomeric sheets 82A,82B and joint 108 (FIG. 5) may then be moved from the support surface 22 and used in a tire building operation. It will also be apparent that the material can "recover" so the support surface 22 should be located relatively closely to a tire building machine before the deformed portions of the joint 108 can return to their original shape and physical dimensions. A way to slow this "recovery" would be to provide a heat source adjacent the cavity 62 to partially cure the rubber material in the joint 108 as it is formed.

From the above description of a Preferred embodiment of the invention, those skilled in the art will perceive improvements, changes and modifications. Such improvements, changes and modifications within the skill of the art are intended to be covered by the appended claims.

Having described a preferred embodiment of the present invention, what is claimed is:

1. A method of joining reinforced elastomeric sheet material, said method comprising the steps of:
   providing first and second reinforced elastomeric sheets, each of the elastomeric sheets having a plurality of elongate reinforcing members extending in a substantially parallel direction and being spaced apart a substantially equal distance;
   arranging an end portion of the first elastomeric sheet in an overlapping relationship with an end portion of the second elastomeric sheet over a cavity in a support surfaces of the reinforcing members in the end portions extend substantially parallel to one another; and
   moving a tool in a direction transverse to the overlapped end portions of the elastomeric sheet form a position outside of the cavity to a position at least partially into the cavity to deform the end portions and to introduce at least one reinforcing member in the end portion of the first elastomeric sheet between adjacent reinforcing members in the end portion of the second elastomeric sheet.

2. The method set forth in claim 1 wherein the support surface is a substantially planar surface.

3. The method set forth in claim 1 wherein the tool is a disk member rotatable about its longitudinal central axis.

4. The method set forth in claim 1 wherein the tool is movable in a direction parallel to the extent of the cavity in the support surface.

5. A method of joining reinforced elastomeric sheet material, said method comprising the steps of:
  providing elastomeric sheet material having parallel extending reinforcing members spaced apart a substantially equidistant first distance;
  providing a surface with a cavity therein;
  overlapping a pair of end portions of the reinforced elastomeric sheet material so each end portion spans the cavity in the surface;
  providing a tool on a side of the overlapped elastomeric sheet material opposite the cavity; and
  moving the tool into contact with the overlapped elastomeric sheet material opposite the cavity; and
  moving the tool into contact with the overlapped end portions and into the cavity to deform the end portions of the elastomeric sheet material and form a join in which the reinforcing members in each of the respective end portions are spaced apart a second distance which is greater than the first distance.

6. The method set forth in claim 5 wherein the second distance is at least 1.33 times the first distance.

7. The method set forth in claim 5 wherein said cavity is sized so the second distance between adjacent reinforcing members in each respective end portion after deformation is at least twice the first distance.

8. The method set forth in claim 5 wherein the tool is movable in a direction parallel to the extent of the cavity in said support means.

9. A method of joining reinforced elastomeric sheet material, said method comprising the steps of:
  providing elastomeric sheet material having parallel extending reinforcing members having a firs density defined as the number of reinforcing members per unit length of sheet material taken in a direction substantially perpendicular to the extent of the reinforcing members;
  providing a support surface with a cavity therein;
  overlapping end portions of the elastomeric sheet material so each end portion spans the cavity in the support surface;
  providing a tool on a side of the elastomeric sheets opposite the cavity; and
  moving the tool into contact with the overlapped end portions and in the cavity to deform the end portions of the elastomeric sheet material and form a joint within the cavity and which joint has a second density of reinforcing member in the range of 1 to 1.5 times the first density.

10. The method set forth in claim 9 wherein the cavity is sized sot ht resulting density of reinforcing members in respective end portions of the elastomeric sheet material is less than 0.67 times the first density.

* * * * *